United States Patent
Fang et al.

(10) Patent No.: US 8,732,089 B1
(45) Date of Patent: May 20, 2014

(54) AUTHENTICATION USING A TRANSACTION HISTORY

(75) Inventors: Peter C. Fang, Redmond, WA (US); Sebastian Lehmann, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1769 days.

(21) Appl. No.: 11/797,455

(22) Filed: May 3, 2007

(51) Int. Cl.
*G06Q 99/00* (2006.01)
*G06Q 20/40* (2012.01)

(52) U.S. Cl.
CPC ..................... *G06Q 20/40* (2013.01)
USPC ................. 705/67; 705/44; 705/76

(58) Field of Classification Search
USPC ............................................. 705/44, 67, 76
See application file for complete search history.

(56) References Cited

U.S. PATENT DOCUMENTS

| | | | |
|---|---|---|---|
| 6,934,860 B1 * | 8/2005 | Goldstein | 713/183 |
| 7,174,462 B2 * | 2/2007 | Pering et al. | 713/182 |
| 7,396,281 B2 * | 7/2008 | Mendelsohn et al. | 463/42 |
| 7,487,226 B2 * | 2/2009 | Blair et al. | 709/219 |
| 7,594,189 B1 * | 9/2009 | Walker et al. | 715/811 |
| 7,739,162 B1 * | 6/2010 | Pettay et al. | 705/35 |
| 7,853,564 B2 * | 12/2010 | Mierau et al. | 707/638 |
| 2003/0018543 A1 * | 1/2003 | Alger et al. | 705/27 |
| 2003/0182143 A1 * | 9/2003 | Conrad et al. | 705/1 |
| 2004/0093527 A1 * | 5/2004 | Pering et al. | 713/202 |
| 2005/0080683 A1 * | 4/2005 | Jordan | 705/26 |
| 2006/0005020 A1 * | 1/2006 | Hardt | 713/166 |
| 2007/0136142 A1 * | 6/2007 | Wolcott et al. | 705/26 |
| 2007/0171471 A1 * | 7/2007 | Grosso et al. | 358/1.15 |
| 2008/0066165 A1 * | 3/2008 | Rosenoer | 726/5 |
| 2008/0174676 A1 * | 7/2008 | Squilla et al. | 348/231.6 |
| 2008/0209223 A1 * | 8/2008 | Nandy et al. | 713/185 |

* cited by examiner

*Primary Examiner* — James D Nigh
(74) *Attorney, Agent, or Firm* — Thomas | Horstemeyer, LLP (57) ABSTRACT

Systems and methods are provided for authenticating a user. In one implementation, a computer-implemented method is provided. According to the method, transaction history information for each one of a set of users is maintained in a storage device. The method provides identifiers associated with items for display and receives, from one of the users, a selection of one or more of the identifiers. The method further authenticates the user as a function of the selection and a transaction history of the user.

38 Claims, 5 Drawing Sheets

AUTHENTICATION USING A TRANSACTION HISTORY

BACKGROUND

I. Technical Field

The present invention generally relates to the field of computerized systems. More particularly, the invention relates to computerized systems and methods for authenticating a user to access or utilize all or part of a computer system.

II. Background Information

To access an account at an Internet site, a user typically submits credentials to the Internet site, which are then authenticated. For example, the most commonly encountered credentials are username and password. The username may be an email address of the user or other alphanumeric identifier. The username, accordingly, may be known to others. By contrast, the password is kept secret by the user and may include a combination of alphanumeric characters.

As the Internet has proliferated as a means of conducting commerce, Internet fraud has also increased. The username and password combination is no longer sufficient to securely authenticate users of Internet sites. For example, through a fraud scheme called "phishing," individuals fraudulently obtain username and password combinations from users that receive electronic messages purporting to originate from a legitimate Internet site. Some phishing techniques send out mass electronic mail messages to persons representing that the messages are from a trusted source (e.g., an Internet site from which the user has purchased goods or services). The messages request a reply from a user providing his or her username and password or provide a link to a page on which the user is requested to confirm his or her username and password.

When a perpetrator of such a phishing technique collects a large number of username and password combinations, the amount of damage the perpetrator may cause is considerable. For example, the perpetrator might execute automated scripts to access a large number of user accounts. If an Internet site allows users to sell items to the public, the perpetrator may use the automated scripts to log into the user accounts, post listings of items with low prices, and collect money without any intention to ship the sold items. Alternatively, the perpetrator might access a user's account information, such as payment information (e.g., credit card information) and/or might make unauthorized purchases using stolen payment information or may place orders with Internet sites.

As is evident from the foregoing, since user account information may be guarded by only username and password combinations, once a perpetrator has obtained a username and password, the perpetrator has access to all aspects of the account because the username and password are the sole line of defense for many accounts. Recognizing that current systems and methods of user authentication do not sufficiently guard against fraud, some Internet sites have added additional authentication steps. For example, some Internet sites present security challenge questions in addition to authenticating a username and password. These security challenge questions might ask the user to submit, for example, his or her mother's maiden name, where the user was born, or a name of a first employer. These questions require the user to remember this information and enter it correctly (e.g., correct spelling, punctuation, etc.) Furthermore, although requiring more effort, perpetrators of fraud may also obtain this information from the user and/or other sources to circumvent extra security measures.

As a result of the foregoing, traditional techniques require more user effort, result in a less user friendly experience, and do not secure user account information. Accordingly, there is a need for improved systems and methods that secure user account information while preserving the user experience.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

The following detailed description refers to the accompanying drawings. Wherever possible, the same reference numbers are used in the drawings and the following description to refer to the same or similar parts. While several exemplary embodiments are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Embodiments disclosed herein provide computer-implemented systems and methods for authenticating a user. The systems and methods may maintain transaction history information for each one of a set of users. For example, the transaction history information may be stored in a storage device. Furthermore, the systems and methods may provide identifiers that are associated with items for display. The identifiers may be provided to, for example, one of the users. The systems and methods may receive, from one of the users, a selection of one or more of the identifiers. Furthermore, the systems and methods may authenticate the user as a function of the selection and a transaction history of the user.

Consistent with a disclosed embodiment, a computer-implemented method is provided for authenticating a user. The method may maintain, in a storage device, transaction history information for a user identifying items previously purchased by the user. The method may further provide a plurality of identifiers associated with items for display. The plurality of identifiers may include at least one identifier of an item previously purchased by the user and a plurality of identifiers of items not previously purchased by the user. The method may receive, from the user, a selection of one or more of the identifiers and determine whether the selected one or more items corresponds with items previously purchased by the user. Furthermore, the method may authenticate the user if the selected one or more items corresponds with items previously purchased by the user.

Consistent with another disclosed embodiment, a computer-implemented method is provided for authenticating a user. The method may maintain, in a storage device, transaction history information for each one of a set of users. The method may provide identifiers associated with items for display and receive, from one of the users, a selection of one or more of the identifiers. Furthermore, the method may authenticate the user as a function of the selection and a transaction history of the user.

Consistent with another disclosed embodiment, a computer-implemented method is provided for authenticating a user. The method may display a group of items comprising a plurality of items that are not included in a transaction history of the user and one or more items that are included in the transaction history of the user. The method may receive, from the user, a selection of one or more items in the group and determine whether the selected one or more items are included in the transaction history. Furthermore, the method may authenticate the user if the selected one or more items are included in the transaction history.

Consistent with yet another disclosed embodiment, a computer-implemented method is provided for authenticating a user. The method may select, for each of a plurality of categories of products, a product. One of the selected products may have been purchased by the user. The method may display identifiers of the selected products and receive, from the user, a selection of one of the identifiers. Furthermore, the method may authenticate the user based on the selection.

Consistent with still yet another disclosed embodiment, a system is provided for authenticating a user. The system may comprise a catalog server including a data store storing identifiers of items and a retail server in communication with the catalog server. The retail server may be operable to transmit a plurality of identifiers of items retrieved from the catalog server and receive, from the user, a selection of one of the identifiers. Furthermore, the retail server may authenticate the user based on the selected identifier.

Consistent with other disclosed embodiments, a computer-readable medium is provided that stores program instructions for implementing any of the above-described methods.

It is to be understood that both the foregoing general description and the following detailed description are exemplary and explanatory only and are not restrictive of the invention or embodiments thereof, as claimed.

Figure 1:
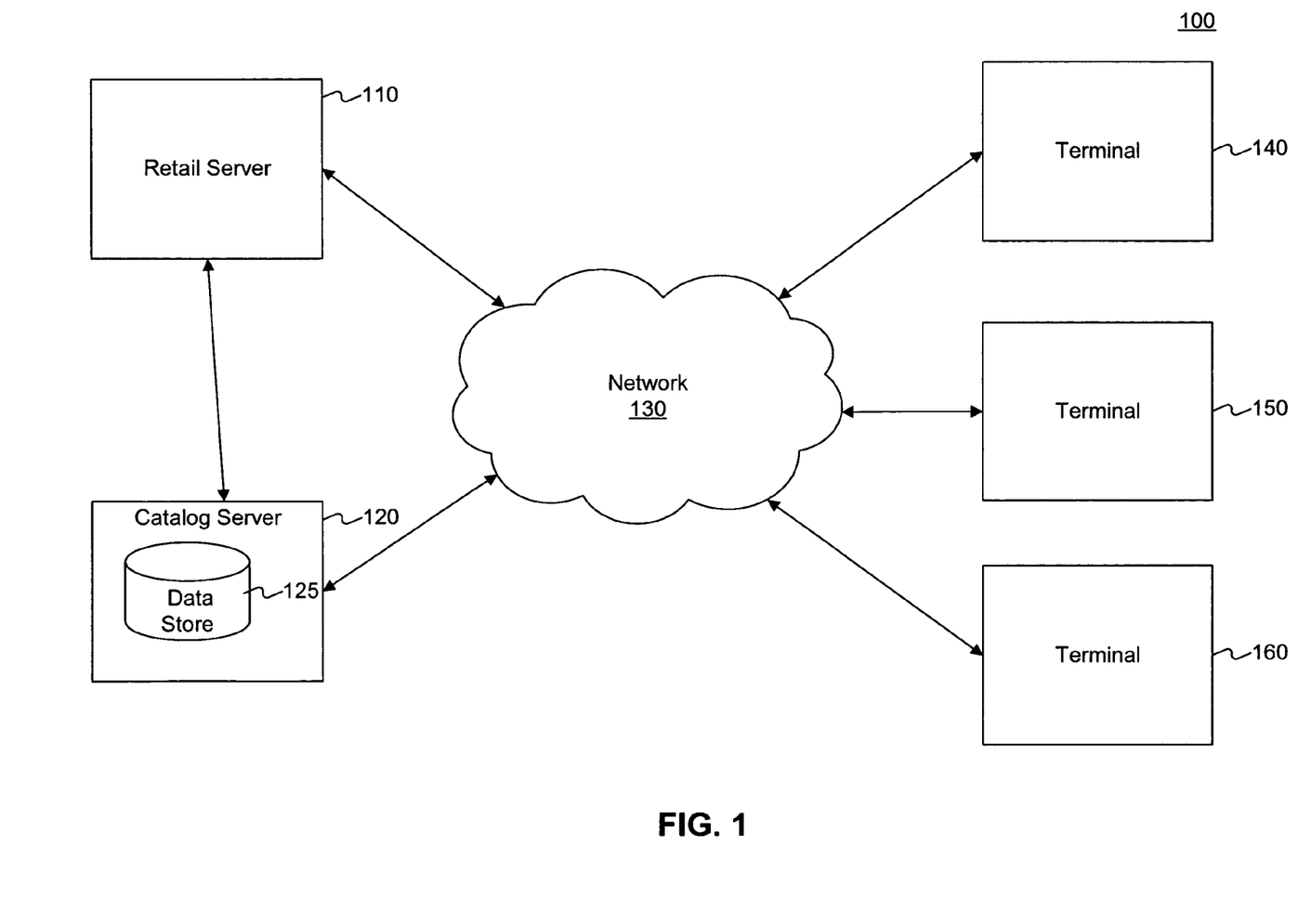
FIG. 1 is a diagram of an example of a system for authenticating a user.

FIG. 1 is an example of a system 100 for authenticating a user in accordance with one or more embodiments of the present invention. In particular, system 100 may provide functionality for authenticating a user based on the user's response to a challenge question that is related to the user's transaction history. As shown in system 100, retail server 110, catalog server 120, and terminals 140-160 are connected to a network 130. One of skill in the art will appreciate that although one retailer server, one catalog server, and three terminals are depicted in FIG. 1, any number of these entities may be provided. Furthermore, one of ordinary skill in the art will recognize that functions provided by one or more entities of system 100 may be combined. For example, functionality provided by retail server 110 and catalog server 120 may be combined.

Network 130 provides communications between the various entities in system 100, such as retail server 110, catalog servers 120, and terminals 140-160. In addition, retail server 110, catalog server 120, and/or terminals 140-160 may access legacy systems (not shown) via network 130, or may directly access legacy systems, data stores, or other network applications. Network 130 may be a shared, public, or private network, may encompass a wide area or local area, and may be implemented through any suitable combination of wired and/or wireless communication networks. Furthermore, network 130 may comprise an intranet or the Internet.

Retail server 110 may comprise a general purpose computer (e.g., a personal computer, network computer, server, or mainframe computer) having one or more processors (not shown in FIG. 1) that may be selectively activated or reconfigured by a computer program. Retail server 110 may also be implemented in a distributed network. For example, retail server 110 may communicate via network 130 with one or more additional retail servers (not shown), which may enable retail server 110 to distribute processes for parallel execution by a plurality of retail servers. Alternatively, retail server 110 may be specially constructed for carrying-out methods consistent with disclosed embodiments. Retail server 110 may provide access to an Internet site, as well as provide functionality for authenticating users, and transmitting data in connection with the sale of products and/or services. Additional details of retailer server 110 are discussed below in connection with FIG. 2.

Catalog server 120 may comprise a general purpose computer (e.g., a personal computer, network computer, server, or mainframe computer) having one or more processors (not shown) that may be selectively activated or reconfigured by a computer program. Furthermore, catalog server 120 may communicate via network 130 or may be in direct bilateral communication with retail server 110. Catalog server 110 may also be implemented in a distributed network. For example, catalog server 110 may communicate via network 130 with one or more additional catalog servers (not shown) storing additional data.

Catalog server 120 may further include a data store 125. Data store 125 may store data describing products and/or services offered for sale by an Internet site provided by retail server 110. For example, data store 125 may store pages that are displayable by a computer executing software, such as an Internet browser. Furthermore, data store 125 may store product/or service descriptions, prices, and media used in connection with the sale of the products and/or services. Media may include any images, photographs, sounds, and/or video clips that provide samples and/or information pertaining to the products and/or services. Products and/or services having information stored in data store 125 may be associated with a unique product identifier (ID), for example.

Terminals 140-160 may be any type device for communicating with retail server 110 and/or catalog server 120 over network 1'30. For example, terminals 140-160 may be personal computers, handheld devices (e.g., PDAs, cellular phones, etc.), or any other appropriate computing platform or device capable of exchanging data with network 130. Terminals 140-160 may each include a processor and a memory (not shown), for example. Further, terminals 140-160 may execute program modules that provide one or more graphical user interfaces (GUIs) for interacting with network resources, such as retail server 110 and/or catalog server 120. Although users of terminals 140-160 may access and/or receive data from retail server 110 and/or catalog server 120, in a preferred embodiment, users at terminals 140-160 may access and/or receive data directly from retail server 110. For example, retail server 110 may retrieve appropriate data from catalog server 120 and serve such data to users at terminals 140-160. As the term is used herein, "users" may include individuals purchasing products and/or services or individuals listing products and/or services for sale through the use of an Internet site provided by retail server 110. Furthermore, "users" may include individuals having electronic accounts, such as accounts storing data in electronic form (e.g., files), financial accounts, social networking accounts, and the like.

Users may access retail server 110 over network 130 through an Internet browser or software application running on any one of terminals 140-160. For example, retail server 110 may transmit a document (e.g., a web page) that is accessible by an Internet browser. The document may include options for a user to log onto a secure site provided by retail server 110. Because the Internet site may use a secure communication environment, such as an HTTPS (hypertext transfer protocol secure) environment to transfer data over network 130, data transfer is assumed to be secure.

Users may log onto the secure site provided by retail server 110 by supplying credentials, such as a username and a password. Furthermore, consistent with disclosed embodiments, retail server 110 may also require the user to respond to a security challenge question after authenticating the username and password. In other disclosed embodiments, retail server 110 may require the user to respond to a security challenge question to access a particular document (e.g., to perform a new transaction). In such an embodiment, retail server 110 may have previously authenticated the username and password combination. In still other disclosed embodiments, retail server 110 may require the user to respond to a security challenge question in lieu of submitting a username and password combination. Security challenge questions and authentication are discussed below in further detail.

Figure 2:
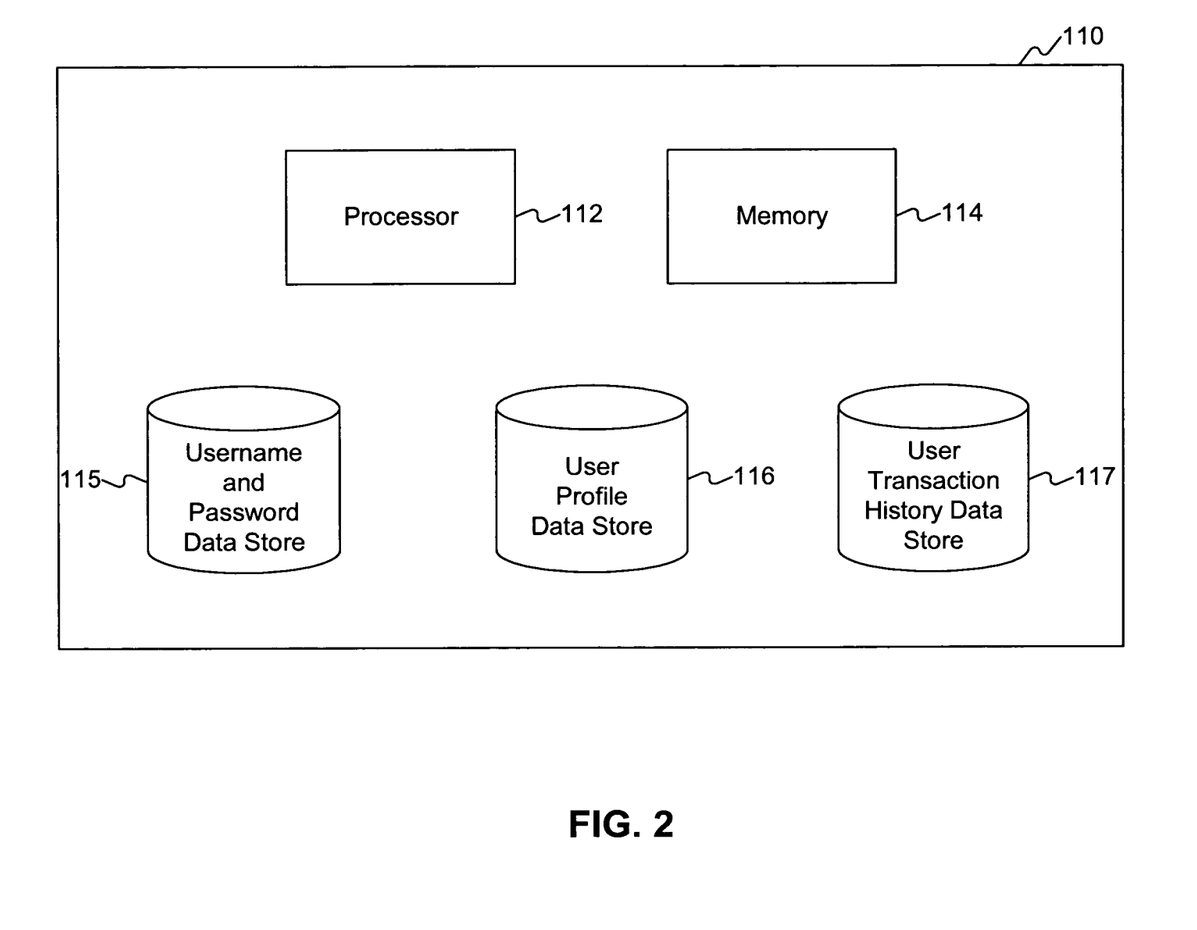
FIG. 2 is a diagram of an example of an architecture of a retail server.

FIG. 2 shows a diagram of an example architecture of retail server 110, in accordance with one or more embodiments of the present invention. Retail server 110 may include a processor 112 and a memory 114. Memory 114 may be one or more memory or storage devices that store data as well as software. Memory 114 may also comprise one or more of RAM, ROM, magnetic storage, or optical storage, for example. Memory 114 may store program modules that, when executed by processor 112, perform one or more processes for operating an Internet site. Program modules that provide authentication functionality are discussed in more detail in connection with FIG. 3.

Retail server 110 may further include a username and password data store 115, a user profile data store 116, and a user transaction history data store 117. Username and password data store 115 may store username and password combinations for users of a retail Internet site provided by retail server 110. For example, username and password data store 115 may store username and password combinations in one or more secure tables. User profile data store 116 may store information pertaining to users. For example, each user may have a profile including information such as name, billing address, shipping address, payment information (e.g., credit card, debit card, account numbers, etc.), age, occupation, etc. User transaction history data store 117 may store transaction histories of user relating to any transaction. Transactions may include any activities participated in by users and/or provided by an Internet site, such as, for example, game histories, email histories, auction histories, download histories, search histories, or purchase histories. For example, a purchase history may include information about orders including completed orders (e.g., orders for products and/or services that have been shipped or provided) and open orders (e.g., orders for products and/or services that have been placed, but have not been shipped or provided). Furthermore, the purchase histories may include the product IDs of the products purchased by users. Product IDs may include product names and/or product numbers, UPCs (Universal Product Codes), ISBN (International Standard Book Number), or any other identifier.

In disclosed embodiments, as part of the authentication process retail server 110 may authenticate a user through the use of a security challenge question. The security challenge question may have a visual component that relates to the user's transaction history. For example, the security challenge question may involve the use of a list of products and/or services that the user has previously purchased. Retail server 110 may select the products and/or services from user transaction history data store 117 and products and/or services from data store 125 that the user has not purchased. Retail server 110 may transmit a page to the user including the products and/or services that have been purchased by the user and the selected products and/or services that have not been purchased by the user. Furthermore, in presenting the security challenge question to the user, retail server 110 may depict the products and/or services visually (e.g., by an image) with or without accompanying text. Retail server 110 may then prompt the user to select one or more products and/or services from the displayed list that the user has purchased. If the user responds with a correct selection, retail server 110 may authenticate the user. Further details concerning the triggering and selection of security challenge questions are discussed below in connection with FIG. 3.

Figure 3:
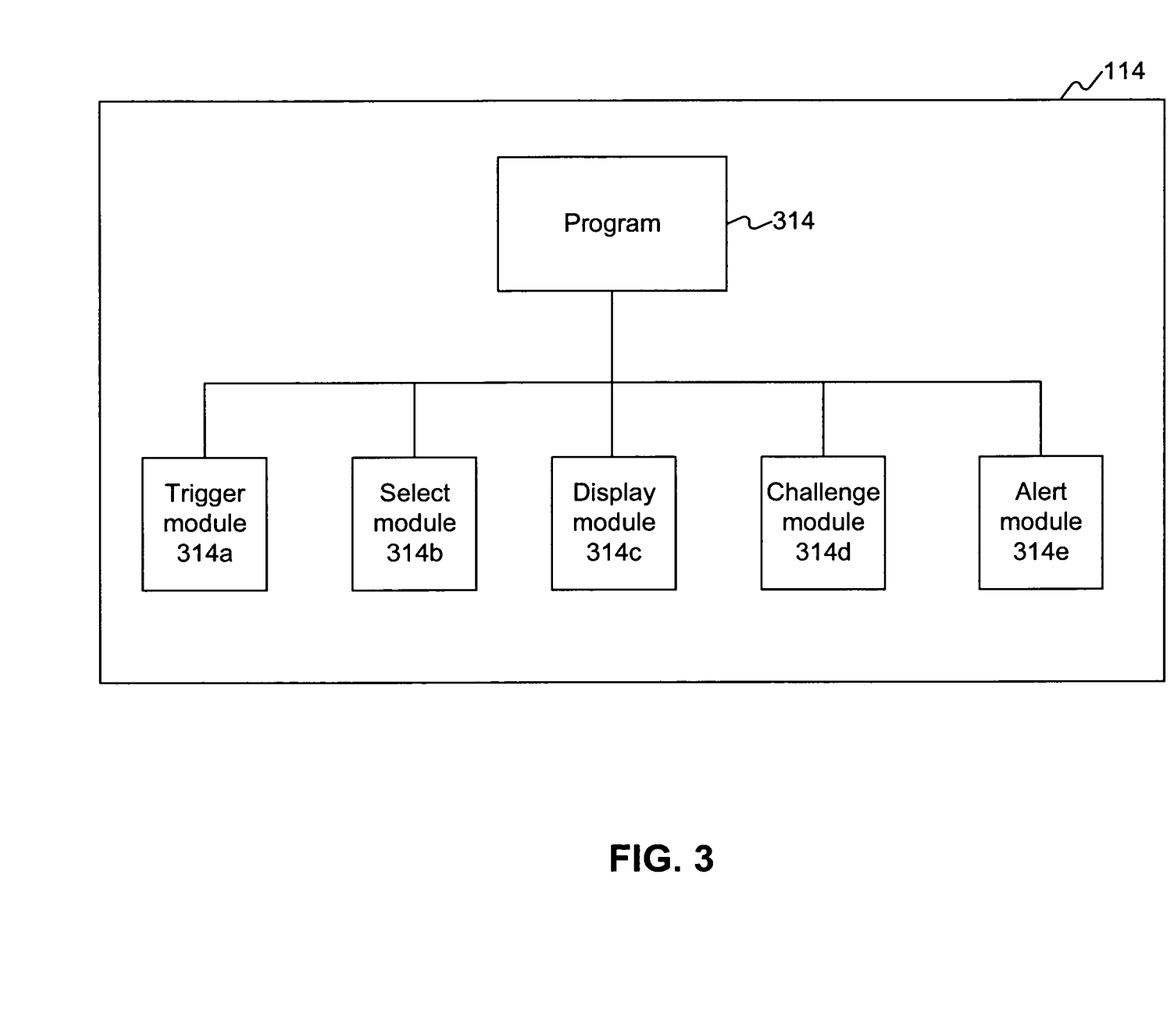
FIG. 3 is a diagram of an example of a software architecture for authenticating a user.

FIG. 3 is a diagram of an example software architecture for authenticating a user, in accordance with one or more embodiments of the present invention. The software architecture may be stored in memory 114 of retail server 110, as shown in FIG. 2, for example. In one embodiment, memory 114 may store instructions of program 314, which when executed, perform one or more data processes for authenticating a user. To do so, program 314 may include instructions in the form of one or more program modules 314a-314e. Program modules 314a-314e may include a trigger module 314a, a select module 314b, a display module 314c, a challenge module 314d, and an alert module 314e.

Trigger module 314a may provide functionality for determining when retail server 110 will prompt a user to respond to a security challenge question. To determine whether to present a security challenge question, trigger module 314a may consider data received from the user's terminal, the page the user is viewing or attempting to view, a status of the user account (i.e., whether an account has been marked for suspected fraud), or whether the user has supplied a username and password that has been authenticated. For example, trigger module 314a may present the security challenge to a user after verification of a username and password combination or upon the occurrence of another event. Accordingly, in some disclosed embodiments, the security challenge question may follow authentication of a username and password combination. However, in other disclosed embodiments, the security challenge question may not follow authentication of a username and password combination.

For example, trigger module 314a may present the security challenge question to a user when the user makes a selection of, or attempts to navigate to, a particular portion or document of an Internet site (e.g., when the user selects a link to view and/or change payment information, shipping address information, or a password). In another embodiment, trigger module 314a may present the security challenge question to a user when retail server 110 detects an unrecognized Internet Protocol (IP) address of the user's terminal or when the user attempts to purchase a new item. For example, a user may have previously accessed retail server 110 from terminal 140. However, on a subsequent occasion, the user may attempt to access retail server from terminal 150. Accordingly, trigger module 314a may present the security challenge question after detecting the unrecognized IP address of terminal 150.

In yet another embodiment, trigger module 314a may present the security challenge question to a user when retail server 110 no longer detects a cookie on the user's terminal. A "cookie" is typically an object that stores information, such as an identifier of the user, user preferences, and active shopping cart information, for example.

Select module 314b may determine which items to include in a security challenge question. For each security challenge question, select module 314b will select one or more items (e.g., products and/or services) that are stored in the user's transaction history and a plurality of items that are not stored in the user's transaction history. Select module 314b may obtain the items stored in the user's transaction history from user transaction history data store 117. Select module 314b may obtain items that are not stored in the user's transaction history from data store 125. Select module 314b may compare, for example, an identifier of any item selected from data store 125 against identifiers stored for the user in user transaction history data store 117 in order to avoid selecting items previously purchased by the user. Furthermore, the selection of items by select module 314b may occur at random or based on certain predetermined rules.

For example, select module 314b may randomly select a product from a plurality of product categories (e.g., selecting a book, a CD, a DVD, an electronic device, and a product purchased by the user). Select module 314b may also randomly select products based on other criteria, such as sales rank, based on a recommendation system, etc. Furthermore, select module 314b may exclude certain popular items based on an exclude list or based on high sales rankings (e.g., exclude best selling books and/or DVDs since a large number of users have purchased them). When selecting items from the user's transaction history, select module 314b may enforce a cutoff point, such as only selecting from items that have been included in the user's transaction history within a particular time period (e.g., within the last six months). Furthermore, select module 314b may determine which product selection techniques are more effective at reducing fraud after monitoring the success rate of prior security challenge questions (e.g., by comparing failure rates for user accounts that have been compromised to determine the best method). Select module 314b may also identify items purchased by the user after the cutoff point and not select those items as being items not included in the user's transaction history.

Although the examples described herein relate to products and/or services, instead of prompting the user to select from products and/or services, other kinds of security challenge questions are consistent with the scope of the present invention. For example, in other disclosed embodiments, the user could be required to select from a list of locations (e.g., city and state) to identify which location or locations the user shipped a recent order. Other alternatives include prompting the user to identify a payment method previously used for a prior purchase.

Figure 4:
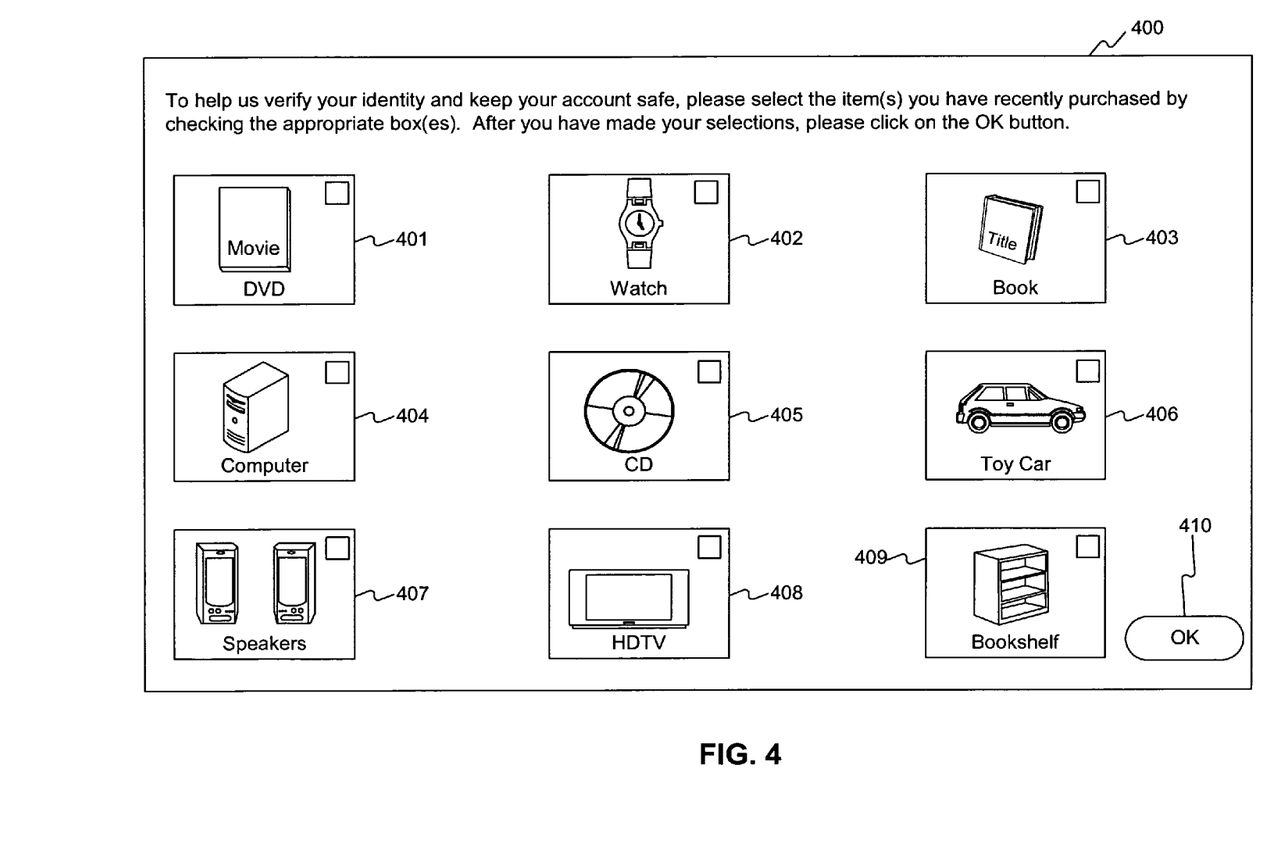
FIG. 4 is an example of a user interface for authenticating a user.

Display module 314c may format and transmit data for a security challenge question to one of terminals 140-160. FIG. 4 provides an example of a user interface and is discussed below in further detail. To generate the user interlace, display module 314c may access data store 125 or network resources over network 130 for media (images, sounds, video clips, etc.) that pertain to items that were selected by select module 314b.

Since the security challenge question may be presented with graphic and/or auditory information, user recall is significantly improved because such information is typically more readily remembered than passwords. For example, display module 314c may format the appearance of the security challenge question, such as the arrangement of items. Display module 314c may list images of the items, or play video and/or sound clips describing the items, or play video showing moving images of the items. For items such as books, CDs, movies, etc, display module 314c may select a sound and/or video clip from the item itself that is reproduced to the user as part of the security challenge question. Furthermore, display module 314c may present the security challenge question using any appropriate identifier to represent an item in lieu of text and/or graphical information. An example of a user interface is shown in FIG. 4 and discussed in further detail.

Challenge module 314d may receive and evaluate user selections of items included in a security challenge question. For example, the user may, in responding to a security challenge question, check a box next to displayed items, clicked and/or highlighted the items, use voice and/or touch selection, or drag/dropped icons of the items, or selected items from pull down lists for item categories, for example. Data representing the selection(s) is then received by retail server 110 for determination of whether or not the selection(s) is correct.

After receiving an incorrect selection, challenge module 314d may determine whether or not to suspend access to the user account (e.g., indefinite or locked for a predetermined time period). Furthermore, challenge module 314d may determine whether to provide a user with a second challenge question in the event of an incorrect answer. For example, after an incorrect answer, challenge module 314d may prevent a user from logging into the account for a predetermined period of time (e.g., must wait an hour) or the user could be locked out until the user calls customer service. If a user makes a mistake, challenge module 314d may determine whether to present a new security challenge question or whether to let the user make a second selection. Additionally, challenge module 314d may require the user to select from two different lists in consecutive pages in order to reduce the chance of a fraudulent lucky guess.

Alert module 314e may generate and send a notification (e.g., an email, voicemail, or text message) to an email address associated with the user account when a suspected intruder has attempted to access the account. The notification may include a message informing the user that someone appears to have tried to fraudulently access his or her account. The message may further indicate that the user should disregard the message if the user was the individual that incorrectly responded to the security challenge question. Furthermore, if the user incorrectly selects an item a predetermined number of times, alert module 314e may send a notification indicating that the user's account has been locked either temporarily or indefinitely. For example, the user may need to wait a predetermined period of time or may need to contact customer service to reactivate the account. Alert module 314e may also send internal alerts to, for example, members of an internal investigation team based on an incorrect response.

Although program modules 314a-314e have been described above as being separate modules, one of ordinary skill in the art will recognize that functionalities provided by one or more modules may be combined.

FIG. 4 is an example of a user interface 400 for authenticating a user in a manner consistent with certain aspects of the present invention. As discussed above, retail server 110 may transmit data for user interface 400 including a challenge question after authenticating a username and password combination or after the user has navigated to or attempted to navigate to a particular page. Furthermore, retail server 110 may determine which products and/or services to include in the security challenge question, as discussed above.

As shown in FIG. 4, user interface 400 includes a display of items 401-409. Each item includes a graphic image depicting a product. Item 401 is a DVD, item 402 is a watch, item 403 is a book, item 404 is a computer, item 405 is a CD, item 406 is a toy car, item 407 is a pair of speakers, item 408 is a HDTV, and item 409 is a bookshelf. Furthermore, user interface 400 includes OK button 410, which a user may, for example, select with a pointing device in order to submit selections to retail server 110. Although nine items are shown in user interface 400, one of ordinary skill in the art will recognize the number and kinds of items may vary. In addition, although both images and text are shown in FIG. 4, along with checkboxes for selecting items, one of ordinary skill in the art will recognize that any identifiers of items are in keeping with the spirit and scope of the present invention (e.g., displaying images without text, sound clips, or video clips, and using other selecting means, such as highlighting, touching, or speaking selections).

A message displayed at the top of user interface 400 may provide instructions for the user. As shown in user interface 400, the user is provided with a message stating, "To help us verify your identity and keep your account safe, please select the item(s) you have recently purchased by checking the appropriate box(es). After you have made your selections, please click on the OK button." Accordingly, the exemplary security challenge question does not specify the number of items that the user is to select. Accordingly, the user must select the items that he or she previously purchased in order to proceed past this authentication screen. In alternative embodiments, the security challenge question may specify to the user to select at least x (e.g., two) number of items from the displayed items that have been purchased within a particular timeframe.

As an example, a user purchased the HDTV shown as item 408 and the computer shown as item 404 within a predetermined time period (e.g., six months). Accordingly, product identifiers for items 404 and 408 are stored in the user's transaction history. The user, however, did not purchase the other items shown in user interface 400 (i.e., items 401-403 and 405-409). Accordingly, if the user selects the check boxes of items 404 and 408 and then OK button 410, retail server 110 will authenticate the user. Any other selection, such as a selection of additional items or fewer items that include or do not include items 404 and 408 cause retail server 110 to return a message to the user indicating that the user has not been authenticated.

Subsequent to an incorrect response, retail server 110 may present the user with a second chance to correctly answer the same security challenge question or may present the user with a second chance to answer a new security challenge question. Furthermore, subsequent to a correct response, for an additional layer of security, retail server 110 may present a second security challenge question (i.e., to be authenticated, the user must answer correctly consecutive security challenge questions). Still further, although shown in FIG. 4 as one group of items, user interface 400 may include two or more groups of items. For example, a user may be prompted to select one or more products from a first group and one or more products from a second group in order to be authenticated.

Although the example user interface 400 shown in FIG. 4 prompts the user to select one or more items that the user has purchased, in an alternative embodiment, user interface 400 may instead prompt the user to select one or more items that the user has not purchased. Furthermore, user interface 400 may include an icon (not shown) providing the user with an option of answering the security challenge question with a response indicating that the user did not purchase any of the displayed items. One of ordinary skill in the art will recognize that modifications as to the number, arrangement, and security challenge questions are in keeping with the spirit and scope of the present invention.

Figure 5:
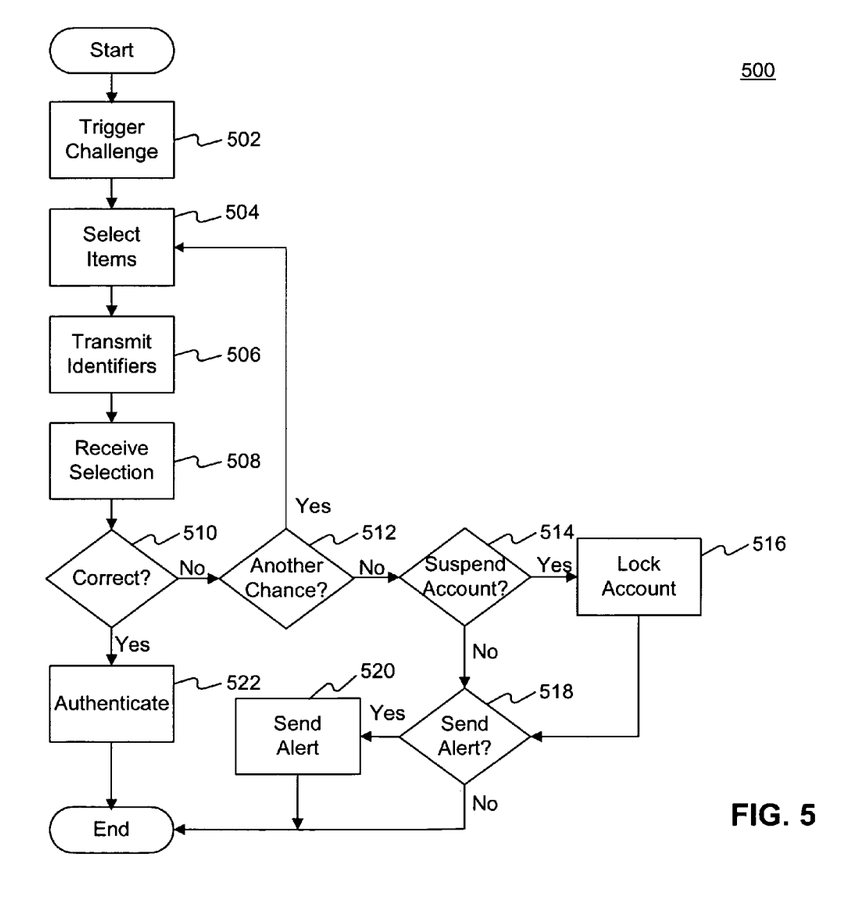
FIG. 5 is an example of a flow diagram of a routine for authenticating a user.

FIG. 5 is a flow diagram 500 of an example of a routine for authenticating a user in accordance with one or more embodiments of the present invention. Routine 500 may implement processes according to one or more of program modules 314a-314e and may include causing retail server 110 to transmit data for a user interface, such as user interface 400.

At the start of routine 500, in block 502, trigger module 314a may determine that a security challenge question should be presented to a user. For example, trigger module 314a may have monitored data received from one of terminals 140-160 from which the user has accessed an Internet site. Triggering of the security challenge question may follow the user viewing or attempting to view a certain page or based on a status of the user account (i.e., whether an account has been marked for suspected fraud), or whether the user has supplied a username and password that has been authenticated. Accordingly, block 502 may occur after verification of a username and password combination or upon the occurrence of another event.

In block 504, select module 314b may determine which items to include in a security challenge question. For each security challenge question, select module 314b will select one or more items (e.g., products and/or services) that are stored in the user's transaction history and a plurality of items that are not stored in the user's transaction history. Select module 314b may obtain the items stored in the user's transaction history from user transaction history data store 117. Select module 314b may obtain the other items that are not stored in the user's transaction history from data store 125.

In addition to selecting items from user transaction history data store 117 to include in the security challenge question, select module 314b may also utilize such information to determine items that should not be included in the security challenge question. For example, if the security challenge question is requesting that the user select items purchased within the last six months, in addition to providing items included in the user transition history that were purchased in the last six months, select module 314b may also determine not to include items that were purchased during the three months preceding the six month window. By specifically excluding items that were actually purchased by the user prior to the specified time-window reduces the likelihood that a user incorrectly select the item as being purchased within the time window based upon a legitimate but incorrect belief that the item was purchased during the specified time-window.

Furthermore, select module 314b may randomly select products that are not stored in the user's transaction history from a plurality of product categories (e.g., selecting a book, a CD, a DVD, an electronic device, and a product purchased by the user). Select module 314b may also select one or more of the products that the user did not purchase by taking into consideration the products that are stored in the user's transaction history. That is, select module 314b may select products that the user did not purchase, but that are similar in product type or are made by the same manufacturer as products that were previously purchased by the user.

In block 506, display module 314c formats and transmits data for the security challenge question, including identifiers of the items selected in block 504, to one of terminals 140-160. For example, display module 314c may access data store 125 or network resources over network 130 for media (images, sounds, video clips, etc.) that pertain to items that were selected by select module 314b.

In block 508, challenge module 314d receives a selection of one or more items from the user at one of terminals 140-160. For example, the user may have checked a box, clicked and/or highlighted, used voice, touch, or drag/dropped icons, or selected items from pull down lists for item categories.

In decision block 510, challenge module 314d evaluates whether or not the received selection is correct. If the received selection is correct, routine 500 proceeds to block 522. For example, in some embodiments, the received selection must be exactly correct (i.e., the user must have selected all items previously purchased that were displayed). However, in other embodiments consistent with the present invention, a majority of correction selections may be sufficient to constitute a correct selection as long as no incorrect items are selected. For example, selecting two out of three items that have been purchased may be sufficient. In contrast, selecting two purchased items and one item that was not purchased may not be sufficient. Still further, in other embodiments, a correct answer may include a small number of incorrect selections (e.g., only one incorrect selection of an item not previously purchased) so long as the rest of the selected items were previously purchased.

In block 522, challenge module 314d authenticates the user and routine 500 completes. However, if the received selection is not correct, routine 500 proceeds to decision block 512.

In decision block 512, because the user has incorrectly answered the security challenge question, challenge module 314d determines whether or not to give the user another chance. For example, challenge module 314d may determine whether to provide a user with a second chance based on how may incorrect responses have been received or based on a status of the account (e.g., suspected fraudulent activity). For example, if multiple unsuccessful attempts to log into an account have been made, then challenge module 314d may determine that the user should not receive a second chance. If the user is given another chance, routine 500 returns to block 504 and proceeds as discussed above. If the user is not given another chance, then routine 500 proceeds to decision block 514.

In decision block 514, challenge module 314d may determine whether to suspend access to the account for which the security challenge question was incorrectly answered. If challenge module 314d is going to suspend access to the account, routine 500 proceeds to block 516. However, if challenge module 314d is not going to suspend access to the account, then routine 500 proceeds to decision block 518.

In block 516, challenge module 314d may lock the account. Routine 500 then proceeds to decision block 518.

In decision block 518, alert module 314e determines whether to send an alert notification. If alert module 314e is going to send an alert, routine 500 proceeds to block 520. In block 520, alert module 314e sends an alert notification. For example, alert module 314e may generate and send a notification (e.g., an email, voicemail, or text message) to an email address associated with the account when a suspected intruder has attempted to access the account. Routine 500 then completes.

As one of ordinary skill in the art will appreciate, one or more of blocks 502-522 may be optional and may be omitted from implementations in certain embodiments.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the blocks of the disclosed routines may be modified in any manner, including by reordering blocks and/or inserting or deleting blocks, without departing from the principles of the invention. It is intended, therefore, that the specification and examples be considered as exemplary only, with a true scope and spirit of the invention being indicated by the following claims and their full scope of equivalents.

What is claimed is:

1. A computer-implemented method for authenticating a user, the method comprising:
maintaining, in a storage device, an electronic catalog comprising a plurality of items available for purchase;
maintaining, in a storage device, a transaction history of a user, the transaction history comprising information identifying items, in the electronic catalog, previously purchased by the user;
selecting, using a computer, a plurality of items for presentation to the user, the plurality of items comprising at least one item, in the electronic catalog, previously purchased by the user and a plurality of items, in the electronic catalog, not previously purchased be the user;
detecting, using the computer, a trigger associated with an operation performed be the user, the operation comprising a user selection of at least a portion of a web page;
presenting, using the computer, a plurality of identifiers associated with the plurality of items to the user in response to the detected trigger;
receiving, using the computer, from the user, a selection of one or more of the identifiers;
determining, using the computer, whether the selected one or more identifiers correspond with items previously purchased by the user; and authenticating, using the computer, the user when the selected one or more identifiers correspond with items previously purchased by the user.

2. The method of claim 1, wherein authenticating comprises:
failing to authenticate the user when one or more of the selected identifiers is not included in the transaction history as an item previously purchased by the user.

3. The method of claim 1, wherein the identifiers comprise images of products.

4. The method of claim 1, wherein the identifiers comprise images of products and text.

5. The method of claim 1, wherein the trigger comprises a validation of a username and a password submitted by the user.

6. The method of claim 1, further comprising detecting, using the computer, wherein the trigger comprises a user selection of a link to user profile information and presenting, using the computer, the plurality of identifiers associated with the plurality of items to the user in response to the detected user selection.

7. The method of claim 1, wherein the trigger comprises a user selection of a new item for purchase.

8. The method of claim 1, further comprising:
identifying, using the computer, in the transaction history, the at least one item in the electronic catalog previously purchased by the user;
identifying, using the computer, in the transaction history, the items in the electronic catalog not previously purchased by the user; and
selecting, using the computer, as the plurality of items for presentation to the user, the identified at least one item in the electronic catalog previously purchased by the user and the identified items in the electronic catalog not previously purchased by the user.

9. A computer-implemented method for authenticating a user, the method comprising:
maintaining, in a storage device, a transaction history of a user, the transaction history comprising information identifying items, in an electronic catalog, purchased by the user;
selecting, using a computer, a plurality of items for presentation to the user, the plurality of items comprising at least one item, in the electronic catalog, purchased by the user and at least one item, in the electronic catalog, not purchased by the user;
detecting using the computer, a trigger associated with an operation performed by the user, the operation comprising a user selection of at least a portion of a web page;
presenting, using the computer, identifiers associated with the plurality of items to the user in response to the detected trigger;
receiving, using the computer, from the user, a selection of one or more of the identifiers; and
authenticating, using the computer, the user as a function of the selection and the transaction history of the user.

10. The method of claim 9, wherein authenticating comprises: authenticating, using the computer, the user when the selected identifiers are included in the transaction history.

11. The method of claim 9, wherein authenticating comprises:
authenticating, using the computer, the user when one or more of the selected identifiers are not included in the transaction history.

12. The method of claim 9, wherein the transaction history is a purchase history.

13. The method of claim 9, wherein the plurality of items are products offered for sale.

14. The method of claim 9, wherein the identifiers comprise images of products.

15. The method of claim 9, wherein the identifiers comprise images of products and text.

16. The method of claim 9, wherein the trigger comprises a validation of a username and a password submitted by the user.

17. The method of claim 9, further comprising detecting, using the computer, a user selection of wherein the trigger comprises a user selection of a link to user profile information and presenting, using the computer, the plurality of identifiers associated with the plurality of items to the user in response to the detected user selection.

18. The method of claim 17, wherein the user profile information includes payment information.

19. The method of claim 9, wherein the trigger comprises an unrecognized Internet protocol address associated with the user.

20. The method of claim 9, further comprising: updating, using the computer, the transaction history of the user.

21. A computer-implemented method for authenticating a user, the method comprising:
selecting, using a computer, a group of items for presentation to a user, the group comprising a plurality of items, in an electronic catalog, that are not included in a transaction history of the user and one or more items, in the electronic catalog, that are included in the transaction history of the user;
detecting, using the computer, a trigger associated with an operation performed by the user, the operation comprising a user selection of at least a portion of a web page;
presenting, using the computer, the group of items to the user in response to the detected trigger;
receiving, using the computer, from the user, a selection of one or more items in the group; determining whether the selected one or more items are included in the transaction history; and
authenticating, using the computer, the user when the selected one or more items are included in the transaction history.

22. The method of claim 21, wherein the transaction history is a purchase history.

23. The method of claim 21, wherein the items are products offered for sale.

24. The method of claim 21, wherein selecting comprises: excluding, using the computer, one or more items that are included in the transaction history of the user from the group based on a sales ranking.

25. The method of claim 21, wherein the items are shipping addresses.

26. The method of claim 21, wherein the items are payment methods.

27. The method of claim 21, wherein presenting comprises: displaying, using the computer, a selectable option to the user that indicates none of the items in the group are included in the transaction history.

28. The method of claim 21, further comprising: playing, using the computer, a sound clip for at least one of the items in the group.

29. The method of claim 21, further comprising: displaying, using the computer, a video clip for at least one of the items in the group.

30. A computer-implemented method for authenticating a user, the method comprising:

selecting, using a computer, for each of a predefined plurality of categories of products, a product, wherein so that at least one of the selected products was purchased by the user;

detecting, using the computer, a trigger associated with an operation performed by the user, the operation comprising a user selection of at least a portion of a web page;

presenting, using the computer, identifiers of the selected products to the user in response to the detected trigger;

receiving, using the computer, from the user, a selection of one of the identifiers; and authenticating, using the computer, the user based on the selection.

31. The method of claim 30, wherein authenticating comprises: authenticating, using the computer, the user when the item corresponding to the selected identifier was purchased by the user.

32. The method of claim 30, wherein authenticating comprises: authenticating, using the computer, the user when the item corresponding to the selected identifier was not purchased by the user.

33. The method of claim 30, wherein the trigger comprises a user selection of a new item for purchase.

34. The method of claim 30, wherein the trigger comprises initiation of a new transaction by the user.

35. The method of claim 30, further comprising detecting, using the computer, a user selection of wherein the trigger comprises a user selection of a user profile and presenting, using the computer, the plurality of identifiers associated with the plurality of items to the user in response to the detected user selection.

36. A system for authenticating a user, the system comprising:
   a catalog server including a data store storing identifiers of items; and
   a retail server in communication with the catalog server, the retail server operable to:
      retrieve a plurality of items from the catalog server, the plurality of items including at least one item included in a transaction history of the user;
      detect a trigger associated with an operation performed by the user, the operation comprising a user selection of at least a portion of a web page;
      transmit, in response to the detected trigger, a plurality of identifiers of the items retrieved from the catalog server to the user;
      receive, from the user, a selection of at least one of the identifiers; and
      authenticate the user based on the received selection.

37. The system of claim 36, wherein the retail server is further operable to:
   authenticate the user when the selected identifier is for an item included in the transaction history of the user.

38. The system of claim 36, wherein the retail server is further operable to:
   authenticate the user when the selected identifier is for an item not included in the transaction history of the user.

* * * * *